April 25, 1950  C. B. WARREN  2,505,595
LUBRICANT METERING DEVICE
Filed July 21, 1944  2 Sheets-Sheet 1

INVENTOR.
Cleve B. Warren
BY
Robert F. Beck
ATTORNEY

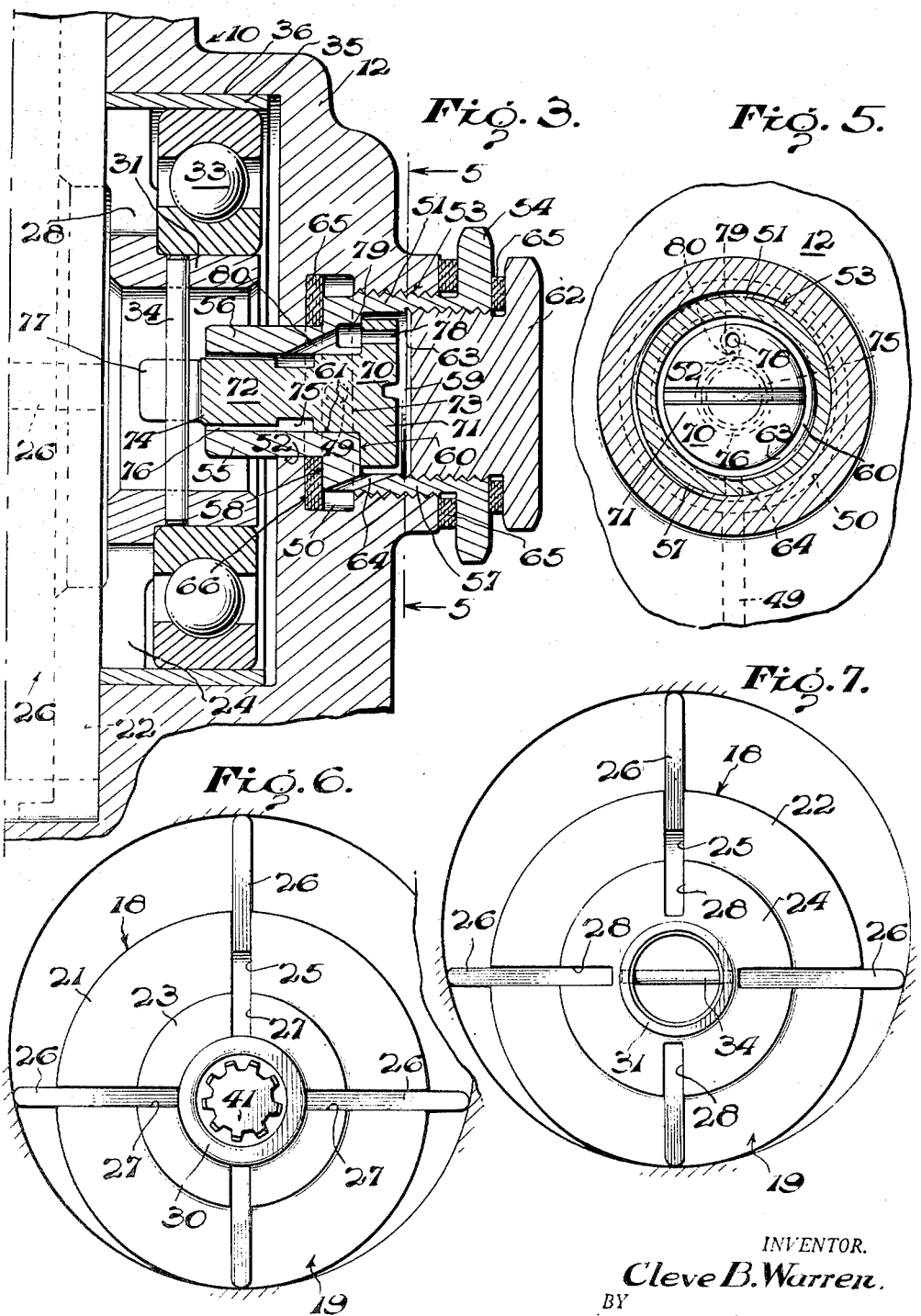

Patented Apr. 25, 1950

2,505,595

UNITED STATES PATENT OFFICE 2,505,595

LUBRICANT METERING DEVICE

Cleve B. Warren, Cedar Grove, N. J., assignor to Bendix Aviation Corporation, Teterboro, N. J., a corporation of Delaware Application July 21, 1944, Serial No. 545,919

4 Claims. (Cl. 184—6)

This invention relates to lubrication, and particularly to mechanism for metering the flow of lubricant.

In many applications, particularly for the obtaining of suction pressures for the operation of air-driven instruments in aircraft, it is desirable to have an engine driven air pump which will use substantially a minimum of lubricant, consonant with efficient operation, to prevent the accumulation of lubricant in the pump chamber and in the outlet of the pump. For this reason, metering devices have been employed and which operate to supply an amount of lubricant to the pump to meet the minimum lubricating requirements thereof.

One of the objects of the present invention is to provide a lubricant metering system for a rotor, which system is so constructed and arranged whereby the metering of lubricant is accomplished by a novel mechanism actuated by the rotor.

Another object of the present invention is to provide lubricating mechanism equipped with replaceable means whereby the quantity of lubricant to be metered can be easily varied.

Additional objects of the invention include the provision of a lubricating mechanism which meters lubricant in an intermittent manner and in positive or predetermined measures under pressure to meet minimum lubricating requirements, and which mechanism is so constructed and arranged as to preclude clogging by the lubricant.

Other objects and advantages will be apparent from a study of the following specification when made in conjunction with the attached drawings, through which like numerals designate like parts.

Fig. 3 is an enlarged, sectional detail view taken along the line 3—3 of Fig. 2;

Fig. 5 is a cross-sectional view taken along the line 5—5 of Fig. 3;

Fig. 6 is an end elevation of one end of the rotor; and

Fig. 7 is an end elevation of the opposite end of the rotor.

Figures 1, 2, 4:
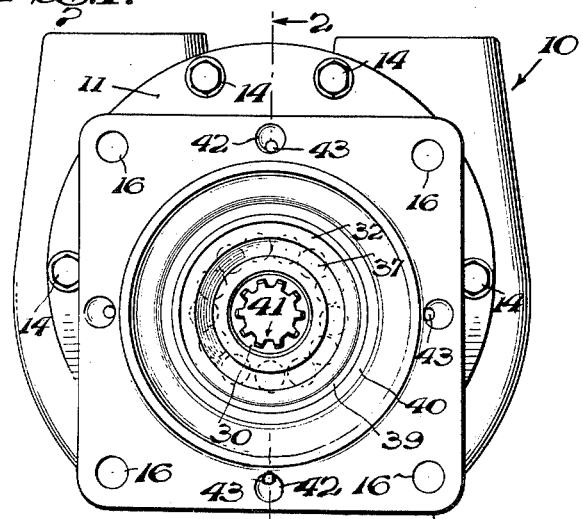
Fig. 1 is an end elevation of an air pump embodying the present invention.
Fig. 2 is a longitudinal sectional view taken along the line 2—2 of Fig. 1.
Fig. 4 is a partial end elevation of the opposite end of the pump with respect to that shown in Fig. 1.

As illustrated in Figures 1 and 2 of the drawings, there is provided an air pump having an aluminum housing 10 comprising end members or walls 11 and 12 and a cylindrical body or chamber portion 13 disposed between and secured to the end walls 11 and 12 by means of studs 14. The end wall 11 includes an integral mounting flange 15 provided with a plurality of holes 16 by which the pump 10 may be attached to the pad of an aircraft engine.

A rotor 18 is eccentrically mounted within the body portion 13 and comprises a cylindrical casing 19 provided with transversely disposed end plates 21 and 22 integrally connected to the casing 19 by brazing, the end plates being formed with outwardly extending circular bosses 23 and 24, respectively. The rotor casing and end plates are provided with registering longitudinal and radial slots 25 in which are mounted, for reciprocation, vanes or blades 26. The bosses 23 and 24 are formed with radial slots 27 and 28 which register with the radial slots 25 of the end plates 21 and 22, respectively. The bosses 23 and 24 are also formed with outwardly and axially extending hollow stud shafts or trunnions 30 and 31 journalled in ball bearings 32 and 33, respectively, the trunnion 31 having secured therein a transversely extending pin or rod 34 for a purpose hereinafter made apparent. The bearing 33 is encompassed by a liner 35 and carried within a recess 36 formed on the inner face of the end wall 12, while the bearing 32 is outwardly sealed as at 37 to preclude leakage of lubricant and is secured within a cylindrical aperture 38 formed in the end wall 11, said bearing 32 being embraced by annular liners 39 and 40 mounted within the aperture 38 and which liners may be of aluminum and steel, respectively. A pinion 41, having a shaft connected within and sealing the trunnion 30, is driven, through suitable coupling means, by the drive shaft of the engine for operating the pump.

The flange 15 is provided with a plurality of circular recesses or depressions 42, each of which communicates with the outer end of an oil channel 43, the latter extending inwardly and discharging into an annular recess 44 surrounding the liner 40. The flange 15 is also provided with an angularly disposed oil channel 45 having one end communicating with the recess 44 and its opposite end, through the medium of a hollow dowel pin 46 with the adjacent end of a bore 47 formed in and extending longitudinally through the body portion 13. The opposite end of the bore 47 communicates, through the medium of a similar hollow dowel pin 48, with an oil conduit 49 formed in the end wall 12 and which oil conduit 49 communicates through a passageway 49 with an annular recess 50 formed in the end plate 12 as clearly illustrated in Figures 1 and 3 of the drawings.

A sleeve member 51 more clearly shown in Figures 3 and 5 extends into a central bore 52 and is threaded within an enlarged coaxial bore 53, both of said bores being formed in the end wall 12 and disposed in spaced relation on opposite sides of the recess 50. The sleeve member 51 is fashioned with an outwardly disposed hexagonal flange or head 54 and a shank portion 55, the latter being formed with a pair of diametrically different sections 56 and 57, respectively. The section 56 is of a smaller diameter than the section 57 and is separated therefrom by a radial shoulder 58. The section 57 is disposed adjacent the flange 54 and is formed, together with the flange, with a socket or compartment 59 defined by an inner radial face 60 formed with a bore or channel 61 extending through the shank portion 55. A headed screw stopper or plug 62 is threaded into the socket to close the outer portion thereof and thus aids in forming a small chamber 63 within the sleeve member and into which lubricant, from the recess 50, is iintroduced through the medium of an angular passageway 64 formed in the sleeve member 51. Suitable sealing gaskets 65 of soft copper or the like are interposed between the heads of the sleeve member 51 and plug 62; the head 54 and adjacent face of the end plate 12; and the shoulder 58 of the sleeve member 51 and a radial face 66 defining the recess 50, whereby, to prevent leakage of lubricant from therebetween.

A metering pin or member 70 is rotatably carried within the sleeve member 51 and comprises a head 71 formed with an integral shank 72, the head having its rear radial face rotatably engaging the radial face 60 within the socket 63. The shank 72 is provided with near and remote sections 73 and 74 with respect to the head 71 and is formed with a circumferential groove 75 disposed between the sections. The section 74 is of lesser diameter than the section 73 to provide a clearance between the section 74 and the face of the bore 61, thus establishing a passage 76 therebetween. The outer end of the section 74 is bifurcated to provide spaced fingers 77 which embrace the pin 34 and thus effect rotation of the metering member 70 coincident with rotation of the rotor 18. The head 71 of the metering member is provided with an orifice 78 adapted to register and communicate with a recess 79 formed in the face 60, upon each rotation of the metering member. An angularly disposed channel 80 is formed in the sleeve member and communicates at one end with the recess 79 and, at the opposite end, opens into the bore 61 whereby lubricant is discharged therein and into the groove 75 as clearly disclosed in Figure 3 of the drawings.

When the pump 10 is mounted on an engine, at least one of depressions 42 (depending on the orientation of the pump 10 on an engine) will register with a similar depression or an interfitting projection on the engine pad which discharges oil at engine pressure, for example, seventy-five pounds per square inch. Oil at this pressure is forced through channel 43 to annular recess 44 and thence to channel 45, bore 47, conduits 49 and 49' and annular recess 50. From the recess 50, oil is forced through angular passageway 64 into chamber 63 and, when orifice 78 is in registry with recess 79, the oil is introduced into the passage 76 through the passageway 80 and groove 75. Oil thus forced into the passage 76 is discharged into the rotor casing 19 through the hollow trunnion 31. The oil entering the rotor casing and flowing along the interior thereof will lubricate the blades 26, the walls defining the slots in which the blades reciprocate and the bearings 32 and 33 by reason of being discharged thereto through the slots during the reciprocation of the blades.

As heretofore stated, the head of the metering member is rotated once for each revolution of the rotor, thereby effecting intermittent registry of the orifice 78 with the recess 79. This operation of the metering member serves to measure the oil introduced into the rotor and by varying the size of the orifice 78, the amount of oil thus introduced into the rotor may be increased or decreased to meet the requirements of pumps of different sizes and types. It will be apparent that by merely removing the plug 62, the metering pin may be readily replaced by another having a different size orifice 78 thereby permitting the quantity of oil or lubricant to be easily varied.

When orifice 78 is out of registry with the recess 79, oil cannot be introduced into the rotor since the pressure of the oil in the chamber 63 serves to force the head 71 into sealing engagement with the radial face 60, thereby precluding leakage of the oil into the bore 61.

In lieu of the described relation of the shank section 74 with the peripheral face of the bore 61, the shank section 74 and/or the peripheral face, may be provided with one or more longitudinally extending grooves for permitting oil to flow from the groove 75 into the rotor.

While only one embodiment of the present invention has been shown in the drawing, it is to be understood that various changes may be made in the construction thereof to suit requirements.

This application is a continuation-in-part of my application filed November 11, 1942, Serial Number 466,896, now abandoned.

I claim:

1. In a metering device, the combination of a housing including a wall, a rotor chamber, a recess between the chamber and the inner side of the wall and a bore from the exterior of the housing through the wall to the recess having inner and outer lengths of small and large diameters, respectively, said large diameter portion having internal screw threads; a rotor in said chamber having a tubular end in said recess and a driving pin held to the rotor across the end; a sleeve having a head outside the wall, a first tubular portion threaded into said threaded bore, a second tubular portion fitting said inner length, and a transverse inner face between said tubular portions; said wall forming an annular chamber about said sleeve and a conduit communicating with said annular chamber and adapted to communicate with a fluid source; a plug screw threadedly mounted in said first tubular portion having an outer end head and an inner end surface cooperating with said face and said sleeve to define a compartment in the sleeve; and a metering pin including an outer head end in said compartment having an axial through aperture, a first shank portion next to the head closely fitting said second tubular portion, an annular fluid passage groove next to said first shank portion, a second shank portion next to said groove loosely fitting said second tubular portion to form a metering passage inwardly from said groove, and a bifurcate inner end straddling said driving pin; said sleeve forming a duct from said axial aperture to said groove and a duct from said annular chamber to said compartment.

2. In a metering device, the combination of a housing including a wall and a bore from the exterior of the housing through the wall having inner and outer portions; a rotor in the housing; a sleeve accessible from the outer side of the wall having a first tubular portion in said outer portion, a second tubular portion fitting said inner portion, and a transverse portion between said tubular portions; said wall forming a chamber about said sleeve and a conduit communicating with said chamber and adapted to communicate with a fluid source; a plug in said first tubular portion accessible from the outer side of said wall having a transverse portion cooperating with said first transverse portion and said first tubular portion to define a compartment in the sleeve; and a metering pin including a head in said compartment having an axial through aperture, a first shank portion next to said head closely fitting said second tubular portion, an annular groove passage next to said first shank portion, a second shank portion next to said groove loosely fitting said second tubular portion to form a metering passage inwardly from said groove, and a portion inwardly from said second shank portion adapted for slip connection to, and disconnection from, said rotor; said sleeve forming a duct from said axial aperture to said groove and a duct from said chamber to said compartment.

3. In a metering device, the combination of a housing including a wall and a bore from the exterior of the housing through the wall having inner and outer portions; a sleeve accessible from the outer side of the wall having a first tubular portion in said outer portion, a second tubular portion fitting said inner portion, and a transverse portion between said tubular portions: said wall forming a chamber about said sleeve and a conduit communicating with said chamber and adapted to communicate with a fluid source; a plug in said first tubular portion accessible from the outer side of said wall having a transverse portion cooperating with said first transverse portion and said sleeve to define a compartment in the sleeve; and a rotatable metering pin including a head in said compartment having an axial through aperture, and a shank in said second tubular portion having an annular groove passage and a portion inwardly of said groove in said second tubular portion along which fluid flows inwardly from said groove, said sleeve forming a duct from said axial aperture to said groove and a duct from said chamber to said compartment 4. In a metering device, the combination of a member having inner and outer sides and a bore from the outer side through the member having inner and outer portions; a sleeve accessible from said outer side having a first tubular portion in said outer portion, and a second tubular portion in said inner portion; said member forming a chamber laterally of said sleeve adapted to receive fluid from a fluid source, a plug in said first tubular portion accessible from the said outer side and cooperating with said sleeve to define a compartment in the sleeve; and a rotatable metering pin including an outer head end in said compartment having an axial through aperture, and a shank in said second tubular portion having an annular groove passage and a portion inwardly of said passage in said second tubular portion along which fluid flows inwardly from said passage, said sleeve having a duct from said aperture to said groove and a duct from said chamber to said compartment.

CLEVE B. WARREN.

REFERENCES CITED

The following references are of record in the file of this patent:

UNITED STATES PATENTS

| Number | Name | Date |
|---|---|---|
| 1,328,015 | Ricardo | Jan. 13, 1920 |
| 1,895,092 | Williams | Jan. 24, 1933 |
| 2,068,803 | Johnson | Jan. 26, 1937 |
| 2,164,794 | Backhouse | July 4, 1939 |
| 2,207,518 | Moser | July 9, 1940 |
| 2,294,387 | Curtis et al. | Sept. 1, 1942 |
| 2,303,114 | Egger | Nov. 24, 1942 |

FOREIGN PATENTS

| Number | Country | Date |
|---|---|---|
| 46,897 | France | Aug. 4, 1936 |